(12) United States Patent
Iizuka et al.

(10) Patent No.: US 7,587,478 B2
(45) Date of Patent: Sep. 8, 2009

(54) METHOD AND COMPUTER PROGRAM PRODUCT FOR MEASURING QUALITY OF NETWORK SERVICES

(75) Inventors: Daisuke Iizuka, Yokohama (JP); Naoki Utsunomiya, Tokyo (JP)

(73) Assignee: Hitachi, Ltd., Tokyo (JP)

(*) Notice: Subject to any disclaimer, the term of this patent is extended or adjusted under 35 U.S.C. 154(b) by 647 days.

(21) Appl. No.: 10/931,086

(22) Filed: Sep. 1, 2004

(65) Prior Publication Data
US 2006/0036724 A1    Feb. 16, 2006

(30) Foreign Application Priority Data
Jul. 5, 2004    (JP)    ............... 2004-197587

(51) Int. Cl.
G06F 15/173    (2006.01)

(52) U.S. Cl. .............. 709/223; 709/224; 709/228; 709/244; 709/245; 370/395.21

(58) Field of Classification Search ........... 709/203, 709/223, 224, 226, 244, 245, 228; 370/395.21
See application file for complete search history.

(56) References Cited

U.S. PATENT DOCUMENTS

| | | | | |
|---|---|---|---|---|
| 5,949,976 | A * | 9/1999 | Chappelle | 709/224 |
| 6,629,126 | B1 * | 9/2003 | Zinky et al. | 709/201 |
| 6,826,617 | B1 * | 11/2004 | Ansell et al. | 709/229 |
| 7,116,990 | B2 * | 10/2006 | Maanoja | 455/456.2 |
| 7,171,157 | B2 * | 1/2007 | Lee | 455/8 |
| 7,275,103 | B1 * | 9/2007 | Thrasher et al. | 709/224 |
| 2002/0002622 | A1 * | 1/2002 | Vange et al. | 709/245 |
| 2002/0059484 | A1 * | 5/2002 | Matsuzuki | 710/5 |
| 2002/0072333 | A1 * | 6/2002 | Gnesda et al. | 455/67.1 |
| 2003/0036379 | A1 * | 2/2003 | Nikolai et al. | 455/414 |
| 2003/0037155 | A1 * | 2/2003 | Lee | 709/230 |
| 2003/0225549 | A1 * | 12/2003 | Shay et al. | 702/182 |
| 2004/0017312 | A1 * | 1/2004 | Anderson et al. | 342/457 |
| 2004/0066776 | A1 * | 4/2004 | Ishidoshiro | 370/352 |
| 2004/0095893 | A1 * | 5/2004 | Goringe et al. | 370/252 |
| 2004/0136327 | A1 * | 7/2004 | Sitaraman et al. | 370/252 |
| 2004/0176040 | A1 * | 9/2004 | Thornton et al. | 455/67.11 |
| 2004/0204907 | A1 * | 10/2004 | Gutowski | 702/182 |
| 2004/0214577 | A1 * | 10/2004 | Borst et al. | 455/446 |
| 2005/0060425 | A1 * | 3/2005 | Yeh et al. | 709/232 |
| 2005/0198262 | A1 * | 9/2005 | Barry et al. | 709/224 |
| 2005/0201278 | A1 * | 9/2005 | Banerjee et al. | 370/229 |
| 2007/0082645 | A1 * | 4/2007 | Malomsoky et al. | 455/338 |

OTHER PUBLICATIONS

Job Management Partner 1/Automatic Job Management System 2, Planning and Administration Guide, pp. 67-102. Sep. 2003.
Job Management Partner 1/Software Distribution Description and System Setup, pp. 1-23. Sep. 2003.

* cited by examiner

Primary Examiner—Oanh Duong
(74) Attorney, Agent, or Firm—Antonelli, Terry, Stout & Kraus, LLP.

(57) ABSTRACT

In a method of reducing a running cost and labor required for quality measurement, client computers matching predetermined district information are selected from a plurality of management target computers receiving network services, a quality measuring program is installed in these client computers to obtain execution results of the quality measuring program, and the quality of network services when the management target computers in the service target district access a server computer.

16 Claims, 15 Drawing Sheets

LOCATION DISTRICT INFORMATION

TABLE OF GLOBAL IP ADDRESSES ASSIGNED TO EACH COUNTRY

TABLE OF MAIN DISTRICT NAMES IN EACH COUNTRY IN THE WORLD

FIG.6A
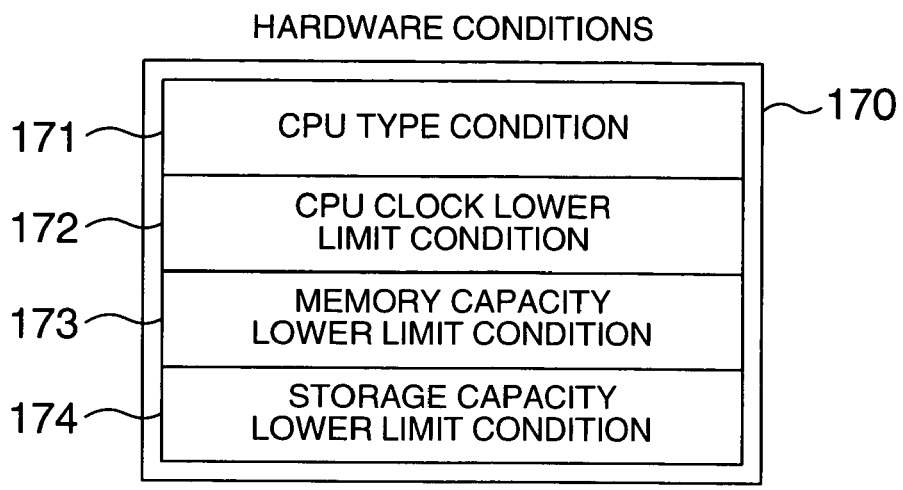
FIG.6B
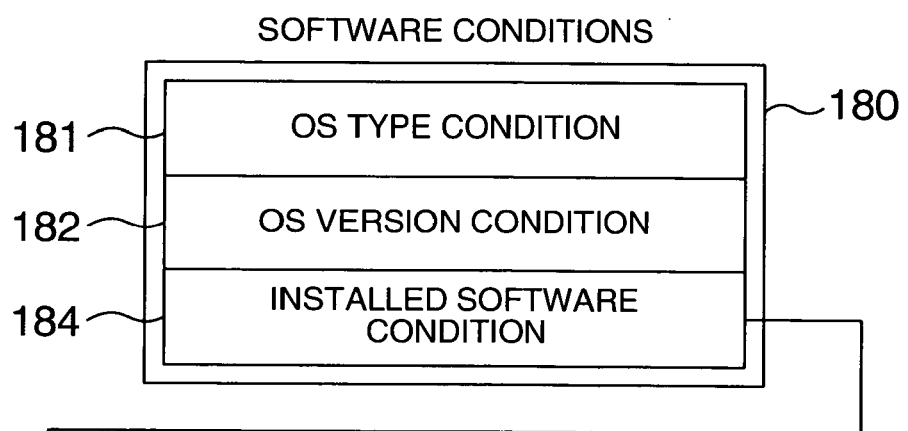
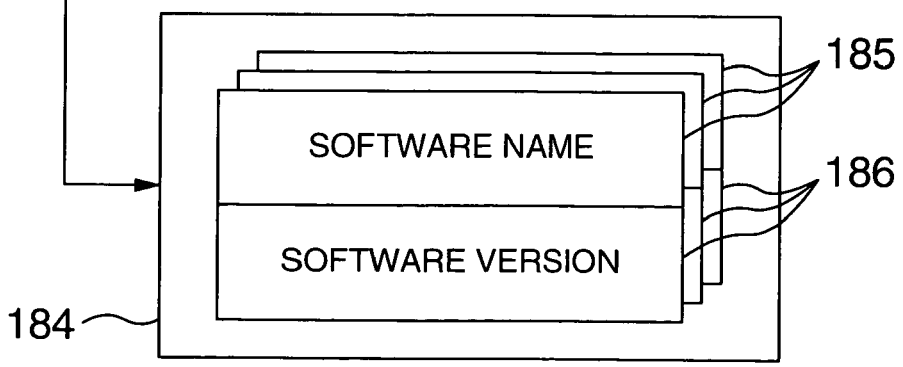

MAIN DISTRICT NAME TABLE

200

| COUNTRY NAME | PREFECTURE/ STATE NAME | LONGITUDE/ LATITUDE | POPULATION |
|---|---|---|---|
| JAPAN | TOKYO | aaa,bbb | xxxxxx |
| JAPAN | OSAKA | aab,bbc | yyyyy |
| JAPAN | AICHI | aac,bbd | zzzzz |
| A | C1 | bbb,ccc | ppppp |
| A | C2 | bbc,ccd | qqqqq |
| ⋮ | ⋮ | ⋮ | ⋮ |

201  202  203  204

METHOD AND COMPUTER PROGRAM PRODUCT FOR MEASURING QUALITY OF NETWORK SERVICES

CLAIM OF PRIORITY

The present application claims priority from Japanese application JP2004-197587 filed on Jul. 5, 2004, the content of which is hereby incorporated by reference into this application.

BACKGROUND OF THE INVENTION

1. Field of the Invention

The present invention relates to technologies which are effective when applied to a quality verification system for network applications which provide services via a network, and to a configuration management system which installs desired software in a computer under specific conditions connected to a network and runs the software.

2. Description of the Related Art

In some systems, a server computer runs network applications in order to provide services to specific districts via the Internet. Verification has been performed to check whether a user of a client computer in the service target district can receive services without any stress. For this verification, a quality verification has been conducted to check whether throughput and latency are satisfactory or not when the client computer in the service target district accesses services provided by the server computer.

More specifically, the system side contracts beforehand with a data center in each service target district. A test computer for measuring the quality is prepared in the data center, and a quality measuring program is made to run on the test computer. The quality such as response (delay) and throughput is measured while accessing services, and the measurement results are verified whether they are satisfactory. For example, refer to "Job Management Partner 1/Automatic Job Management System 2, Planning and Administration Guide", PP. 67-102, issued in 2003, Hitachi Ltd., and "Job Management Partner 1/Software Distribution, Description and System Setup", pp. 1-23, issued in 2003, Hitachi Ltd.

According to the above-described conventional technologies, the system side is required to contract with a data center in each service target district, the test computer is required to be prepared in the data center, and the quality measuring program is required to be run on the test computer. It is necessary to install the quality measuring test computer in each service target district, posing the problem of an increase in cost at the data center and in labor of an administrator.

If such services are provided by grid computing (hereinafter called global grid) which shares physically distributed computer resources by interconnecting them via the Internet and the quality of services between the client computer and server computer is to be measured, the cost and administrator labor increase considerably because data centers are distributed in the global scale and a number of test computers are installed in all service target districts.

SUMMARY OF THE INVENTION

An object of this invention is to reduce operation cost and labor required for service quality measurements.

According to the invention, computers which match predetermined district information are selected from a plurality of computers receiving network services, a quality measuring program is installed in these client computers to obtain execution results of the quality measuring program, and the quality of network services when the management target computers in the service target district access a server computer.

Accordingly, in the present invention, verification of the quality of services provided to a particular service target district when a computer (client computer) in the service target district accesses the service providing computer (server computer or host) can be made without disposing a quality measuring computer in the service target district. A running cost can be reduced.

Further, without acquiring from an administrator a use permission of a computer already in the service target district, verification of the quality of services between the service providing computer and a service receiving computer can be obtained so that labor of the administrator can be reduced.

Other objects, features and advantages of the invention will become apparent from the following description of the embodiments of the invention taken in conjunction with the accompanying drawings.

BRIEF DESCRIPTION OF THE DRAWINGS

FIGS. 6A and 6B are illustrative diagrams showing a quality measuring program operation environment constituting the provisioning mechanism, including examples of hardware conditions (FIG. 6A) and software conditions (FIG. 6B).

DESCRIPTION OF THE EMBODIMENTS

Embodiments of the invention will be described with reference to the accompanying drawings.

Figure 1:
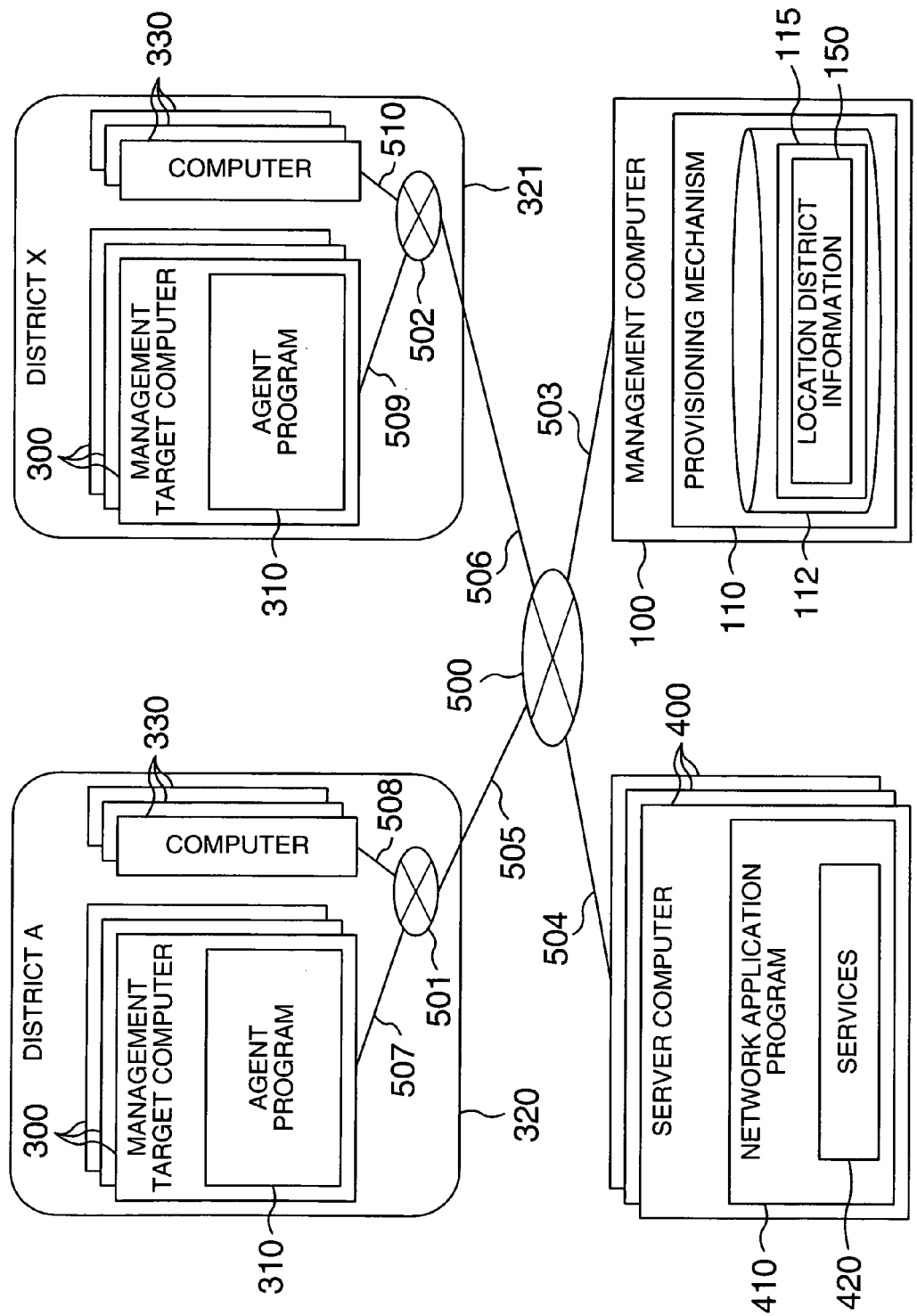
FIG. 1 is a diagram showing the whole configuration of a system according to a first embodiment.

FIG. 1 is a diagram showing the whole configuration of a system wherein the invention is applied to the global grid.

A district A 320 and a district X 321 are shown in FIG. 1. Although there are other districts, they are shown omitted in FIG. 1. The district A 320 is either a country in the world or a local district in the country such as a state and a prefecture. The district X 321 is also either a country in the world or a local district in the country such as a state and a prefecture.

A plurality of management target computers 300 and computers 330 exist in the whole area including the districts A 320 and X 321. A network 501 is disposed in the district A 320 and interconnects the management target computers 300 and computers 330 in the district A 320. Similarly, a network 502 is disposed in the district X 321 and interconnects the management target computers 300 and computers 330 in the district X 321.

The networks 501 and 502 of the districts are interconnected via the Internet 500. A plurality of server computers 400 and a management computer 100 are connected to the Internet 500. Namely, the management target computers 300 and computers 330 are connectable to the server computers 400 and management computer 100 via the Internet 500.

The network 501 or 502 in the district A 320 or X 321 is a network in an administrative unit of a country such as a local IP network disposed in a state or prefecture, or a network disposed in each country.

The management target computers 300, computers 330, management computer 100 and server computers 400 are each assigned a global IP address, and are connected to the same network via the network 501, 502 and Internet 500, so that communication is possible between arbitrary computers. The management target computers 300, computers 330, management computer 100 and server computers 400 are each provided with a CPU, a memory and a storage.

All the management target computers 300 participate in the global grid and are managed by the management computer 100. An agent program 310 runs on all the management target computers 300. The agent program 310 communicates with a provisioning mechanism 110 operating on the management computer 100, via the network 501, 502 and Internet 500, and manages the management target computers 300 on which an agent program 310 runs, in accordance with an instruction from the provisioning mechanism 110.

The management computer 100 manages all the management target computers 330 participating in the global grid. The provisioning mechanism 110 operates in the management computer 100 and manages configuration management information and service quality information of the management target computers 300 in each district.

The provisioning mechanism 110 stores the configuration management information 115 of all the management target computers 300 in a configuration management information storage area 112. The configuration management information 115 includes location district information 150 representative of the district in which the management target computers 300 corresponding to the configuration management information exist.

In cooperation with the agent program 310 running on an arbitrary management target computer 300, the provisioning mechanism 110 has: a function of installing and uninstalling an arbitrary program in and from the management target computer 300 on which the agent program runs; a function of executing and stopping the installed program; a function of collecting the execution results after the program is executed, in the management computer 100; and a function of collecting hardware information and software information of the management target computer 300. The provisioning mechanism 110 has a function of storing the hardware information and software information collected from an arbitrary management target computer 300 as the configuration management information 115, in the configuration management information storage area 112 reserved beforehand in the management computer 100.

A network application program 410 runs on each server computer 400. The network application program 410 running on the server computer 400 provides network services 420 to a specific service target district assuming that the computer 300 in the specific service target district accesses via the network 501, 502 and Internet 500.

Figure 2:
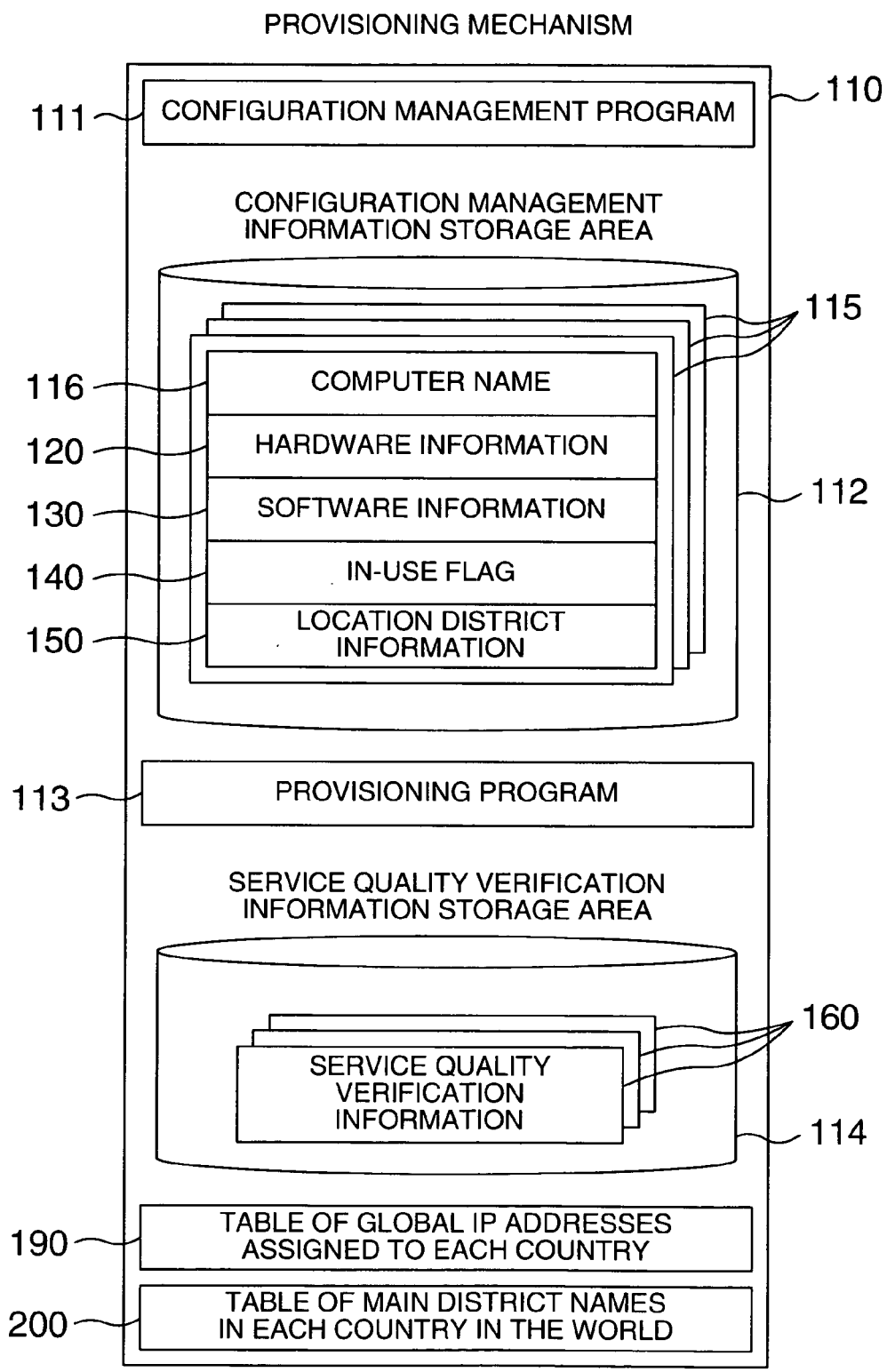
FIG. 2 is a diagram showing the structure of a provisioning mechanism installed in a management computer.

FIG. 2 is a block diagram showing the program structure of the provisioning mechanism 110 of this embodiment.

Referring to FIG. 2, the provisioning mechanism 110 is constituted of: a configuration management program 111 for managing the configuration management information 115 of the management target computers 300 in each district; the configuration management information storage area 112 for storing the configuration management information 115; a provisioning program 113 for managing the service measurements of the management target computers 300; a service quality verification information storage area 114 for storing service quality verification information 160 to be described later; tables 190 of global IP addresses assigned to each country; and tables 200 of main district names in each country in the world. The provisioning mechanism 110 maintains and manages the management target computers 300.

The configuration management program 111 is a program for managing the configuration management information of all the management target computers 300. In order to manage the configuration management information of all the management target computers 300, the configuration management program 111 collects the configuration management information (hardware information 120, software information 130 and the like) of each management target computer 300 to form the configuration management information 115 which is stored in the configuration management information storage area 112. Each piece of the configuration management information 115 is referred to, changed or deleted by the configuration management program 111 and provisioning program 113.

The configuration information 115 of all the management target computers 300 is stored in the configuration management information storage area 112.

The configuration management information 115 is constituted of a computer name 116, hardware information 120, software information 130, an in-use flag 140 and location district information 150, respectively of each management target computer 300.

The computer name 116 is a name for identifying each piece of the configuration management information 115 and the management target computer 300 corresponding to the configuration management information.

The hardware information 120 is information of hardware constituting the management target computer 300 corresponding to the configuration management information 115, the information being constituted of, for example, a CPU processing capability (maximum clock number), a memory capacity and the like.

The software information 121 stores an identifier of software installed in the management target computer 300 corresponding to the configuration management information 115, for example, the name and version of software as will be later described.

The in-use flag 140 stores a true/false value representative of whether the management target computer 300 corresponding to the configuration management information 115 runs a program in response to an instruction from the provisioning mechanism 110.

The location district information 150 stores an identifier of the district in which the management target computer 300 corresponding to the configuration management information 115 exists.

The provisioning program 113 searches the configuration management information 115, selects the management target computer 300 existing in the service target district of predetermined network services 420, installs a quality measuring program 162 in the management target computer 300 to execute it, acquires the quality information which is the execution results of the quality measuring program 162, and notifies the quality verification (measurement) results to an administrator of the network services 420.

The service quality verification information storage area 114 stores the service quality verification information 160 which is the information to be used for verifying the quality of the network services 420.

The table 190 of global IP addresses assigned to each country stores the range of global IP addresses and information of the county to which the global IP address range is assigned.

The table 200 of main district names in each country in the world stores a name of each country in the world and information such as an administrative unit of the country, e.g., as a state and a prefecture.

Figure 3A:
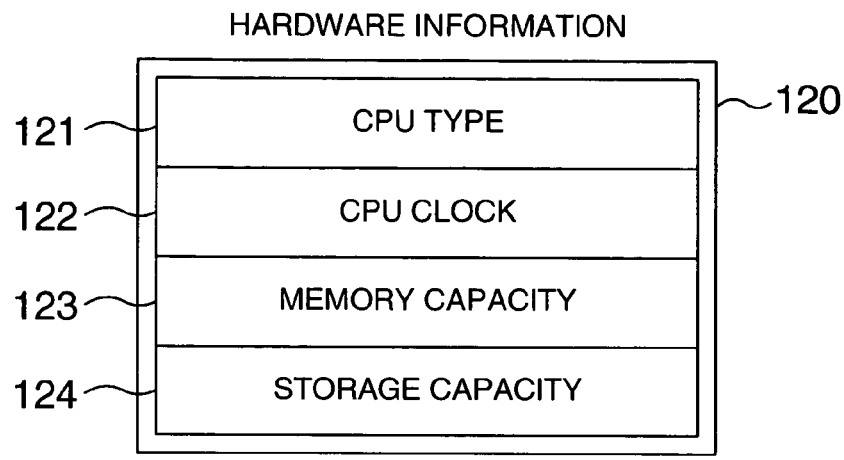
FIGS. 3A and 3B are illustrative diagrams showing the contents of configuration management information of the provisioning mechanism, including hardware information (FIG. 3A) and software information (FIG. 3B).
Figure 3B:
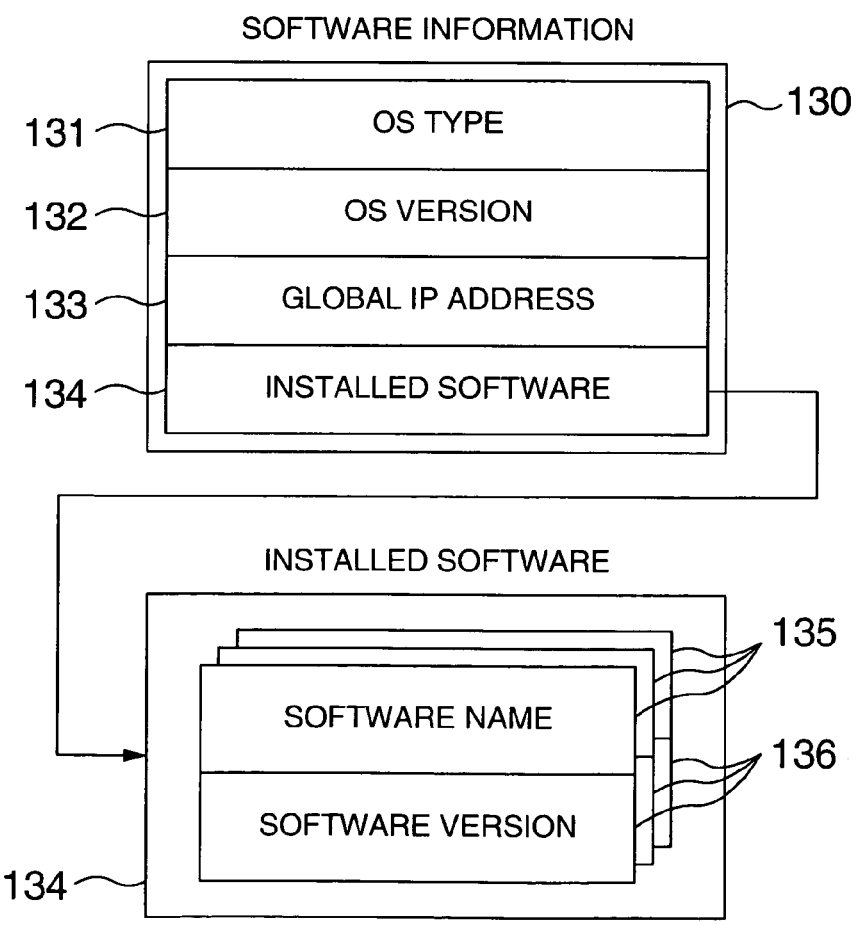

FIG. 3 is a diagram showing the structure of the hard ware information 120, software information 130 and installed software 134 of the software information 130, respectively stored in the configuration management information 115.

Referring to FIG. 3, the hardware information 120 is constituted of a CPU type 121, a CPU clock 122, a memory capacity 123 and a storage capacity 124. The software information 130 is constituted of an OS type 131, an OS version 132, an IP address 133 and installed software 134. The installed software 134 is constituted of a plurality of pairs of a software name 135 and a software version 134.

The CPU type 121 in the hardware information 120 stores the type of a CPU mounted on the management target computer 300 corresponding to the configuration management information 115. The CPU clock 122 stores the highest operation frequency of CPU mounted on the management target computer 300 corresponding to the configuration management information 115. The memory capacity 123 stores the capacity of a physical memory mounted on the management target computer 300 corresponding to the configuration management information 115. The storage capacity 124 stores the capacity of a storage usable by the management target computer 300 corresponding to the configuration management information 115.

The OS type 131 of the software information 130 stores the type of an OS running on the management target computer 300 corresponding to the configuration management information 115. The OS version 132 stores the version of OS running on the management target computer 300 corresponding to the configuration management information 115. The global IP address 133 stores a global IP address assigned to OS running on the management target computer 300 corresponding to the configuration management information 115.

In the installed software 134, the name and version of each piece of software installed in the management target computer 300 corresponding to the configuration management information 115 in accordance with an instruction from the provisioning mechanism 110, are stored as the software name 135 and software version 136.

Figure 4:
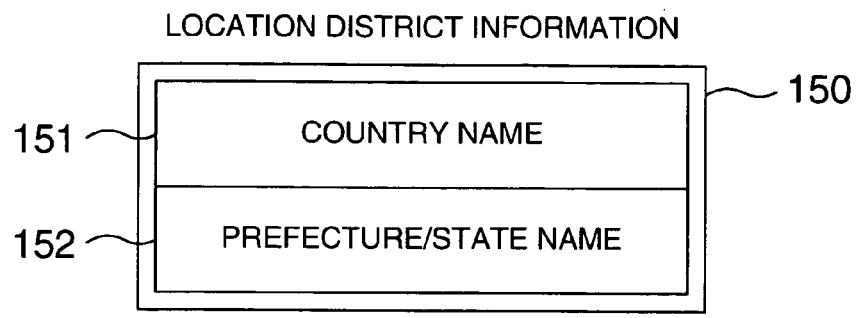
FIG. 4 is an illustrative diagram showing an example of location district information of the configuration management information.

FIG. 4 is a diagram showing the structure of the location district information 150 of this embodiment.

Referring to FIG. 4, the location district information 150 is constituted of a country name 151 and a prefecture/state name 152.

The country name 151 and prefecture/state name 152 store the names of a country and a prefecture/state in which the management target computer 300 corresponding to the configuration management information exists.

Figure 5:
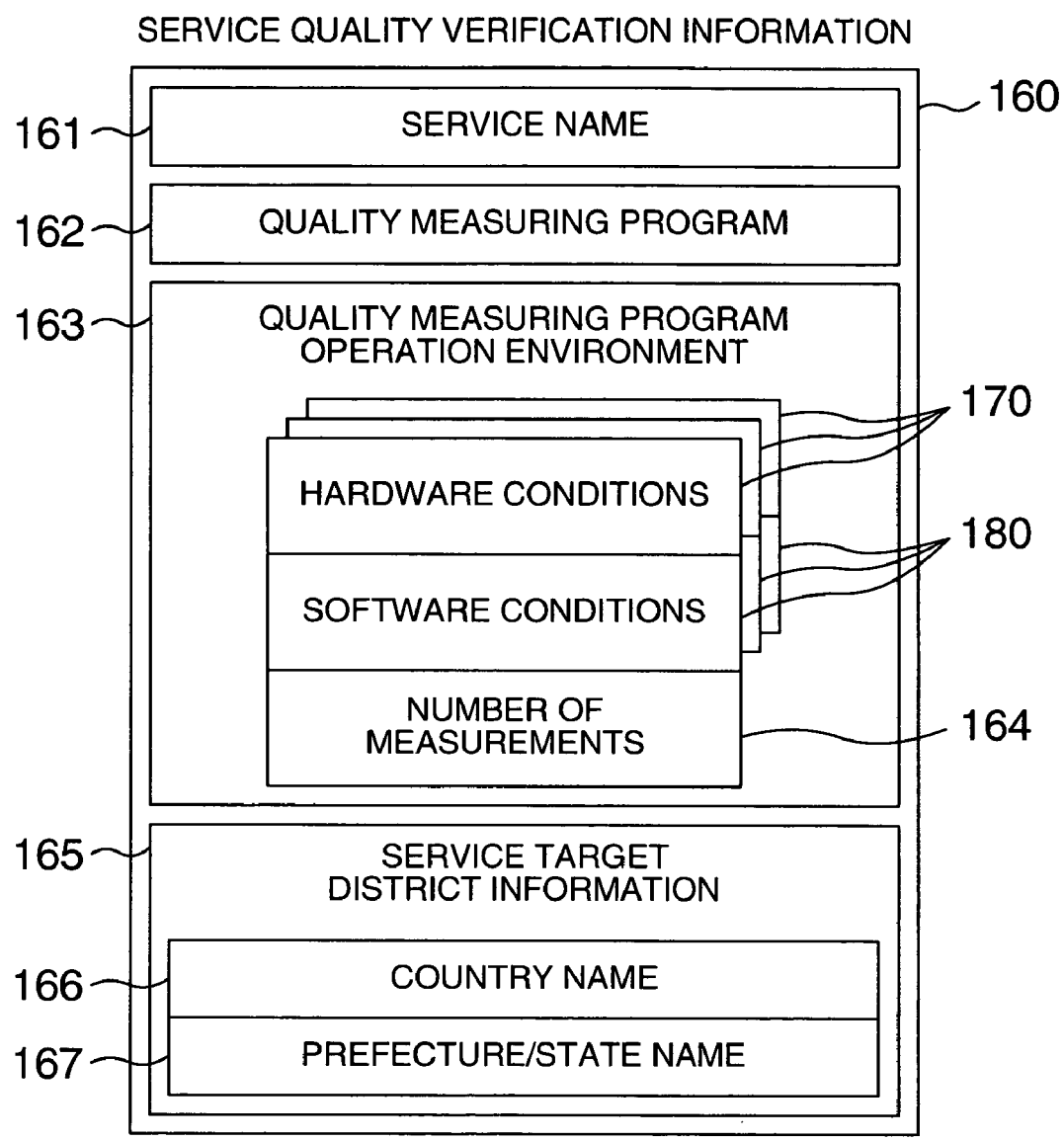
FIG. 5 is an illustrative diagram showing service quality verification information constituting the provisioning mechanism.

FIG. 5 is a diagram showing the structure of the service quality verification information 160 of the embodiment.

Referring to FIG. 5, the service quality verification information 160 is constituted of a name 161 of services whose quality is measured, a quality measuring program 162, a quality measuring program operation environment 163 and service target district information 165 representative of the service target district which is a target of the quality measurement.

The service name 161 is a name for identifying each piece of the service quality verification information 160 and identifying the network services 420 for verification by using the service quality verification information 160. The quality measuring program is a program for measuring throughput and latency when the management target computer 300 located in the service target district accesses the network services 420 for the verification using the service quality verification information 160.

The operation environment 163 of the quality measuring program 162 is the conditions of selecting the management target computer 300 for which the quality measuring program 162 is made to run, from all management target computers 300, and includes a plurality of hardware conditions representative of the conditions of hardware information of the management target computers 300, a plurality of software conditions representative of the conditions of software information of the management target computers 300, and the number 164 of measurements indicating how many computers are used for the measurements. There are a plurality of hardware conditions 170 and a plurality of software conditions 180. In the configuration management information 115 of the management target computer 300, if the hardware information 120 in the configuration management information 115 satisfies one of a plurality of hardware conditions 170 and the software information 130 in the configuration management information 115 satisfies one of a plurality of software conditions 180, it is impossible to normally run the quality measuring program 162 on the management target computer 300.

The service target district information 165 indicates a service target district of the network services 420 for verification using the service quality verification information. The service target district information 165 is constituted of the country name 166 and prefecture/state name 167. The country name 166 indicates the country which is the service target district of the network services 420 for verification using the service quality verification information. The prefecture/state name 167 indicates the prefecture/state which is the service target district of the network services 420 for verification using the service quality verification information.

FIGS. 6A and 6B are diagrams showing the structure of hardware conditions 170, software conditions 180 and installed software conditions 184 in the software conditions 180, respectively stored in the service quality verification information 160 of the embodiment.

Referring to FIGS. 6A and 6B, the hardware conditions 170 are constituted of a CPU type condition 171 for identifying the type of a CPU of the management target computer 300 for which the quality is measured, a CPU clock lower limit condition 172 indicating the lower limit of a CPU operation clock, a memory capacity lower limit condition 173 and a storage capacity lower limit condition 174.

The software conditions 180 is constituted of an OS type condition 181 indicating the type of an OS for which the quality is measured, an OS version condition 182, and an installed software condition 184. The installed software condition 184 is constituted of a plurality of pairs of a software name 185 and a software version 186.

The CPU type condition 171 indicates the type of a CPU of the management target computer 300 which can run the quality measuring program 162. The CPU clock lower limit condition 172, memory capacity lower limit condition 173 and storage capacity lower limit condition 174 indicate respectively the minimum condition of the CPU clock number, the minimum condition of the memory capacity and the minimum condition of the storage capacity, respectively of the computer capable of running the quality measuring program 162.

The OS type condition 181, OS version condition 182, and installed software condition 184 indicate respectively an OS type condition, an OS version condition and an installed software condition, respectively of the computer capable of running the quality measuring program 162.

Each pair of software name 185 and software version in the installed software condition 184 indicates the condition that the software having the same name as the software name 185 and the same version as the paired software version 186 was installed. If there are a plurality of pairs of the software name 185 and software version 186 in the installed software condition 184, the above-described condition should be satisfied for all pairs of the software name 185 and software version 186 in order to satisfy the installed software condition.

Figure 7A:
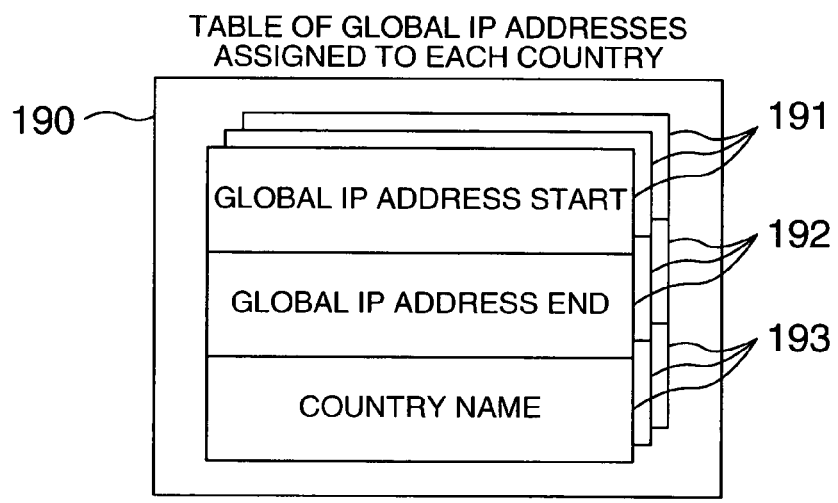
FIGS. 7A and 7B are tables of global IP addresses constituting the provisioning mechanism and main district names, including a table (FIG. 7A) of global IP addresses assigned to each country and a table (FIG. 7B) of main district names of each country in the world.
Figure 7B:
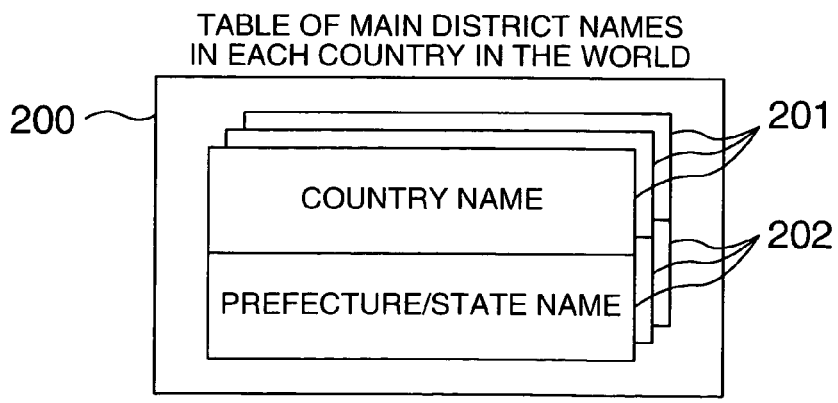

FIGS. 7A and 7B are diagrams showing examples of the structures of a table 190 of global IP addresses assigned to each country and a table 200 of main district names of each country in the world. Referring to FIGS. 7A and 7B, the table 190 of global IP addresses assigned to each country is constituted of a plurality of sets of a global IP address start 191, a global IP address end 192 and a country name 193. The table 200 of main district names of each country in the world is constituted of a plurality of pairs of a country name 201 and a prefecture/state name 202.

Each of a plurality of tables 190 of global IP addresses assigned to each country constituted of a plurality of sets of the global IP address start 191, global IP address end 192 and country name 193, indicates that the range of global IP addresses from the global IP address start 191 to the global IP address end 192 is assigned to the country name 193. The contents of these tables are formed in accordance with global IP address assignment information in each country made public by ICANN which manages all global IP addresses, by low level organizations of ICANN, including APNIC, ARIN, RIPE, LAPNIC, AfriNIC, and by global IP address generalization facilities in each country in the world, and in accordance with routing information of routers which perform routing over a number of countries.

The table 200 of main district names in each country in the world stores pairs of the country name 201 and prefecture/state name 202 representative of the name of each country and the name of each prefecture/state in the country.

FIGS. 8 to 12 are flow charts illustrating an example of processes of the embodiment.

Figure 8:
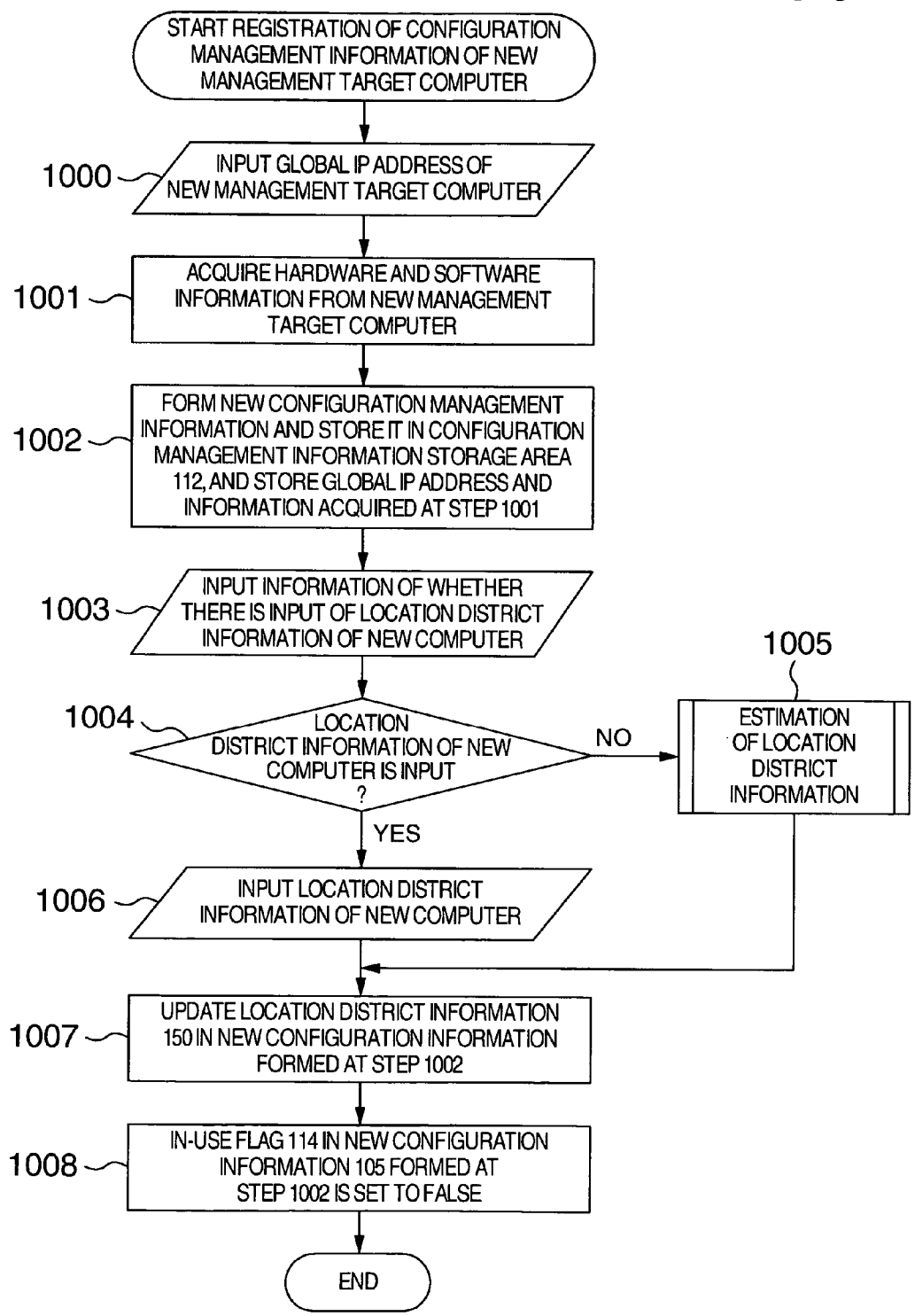
FIG. 8 is a flow chart illustrating an example of a process of registering a computer to be newly managed, the process being executed by the provisioning mechanism of the management computer.
Figure 9:
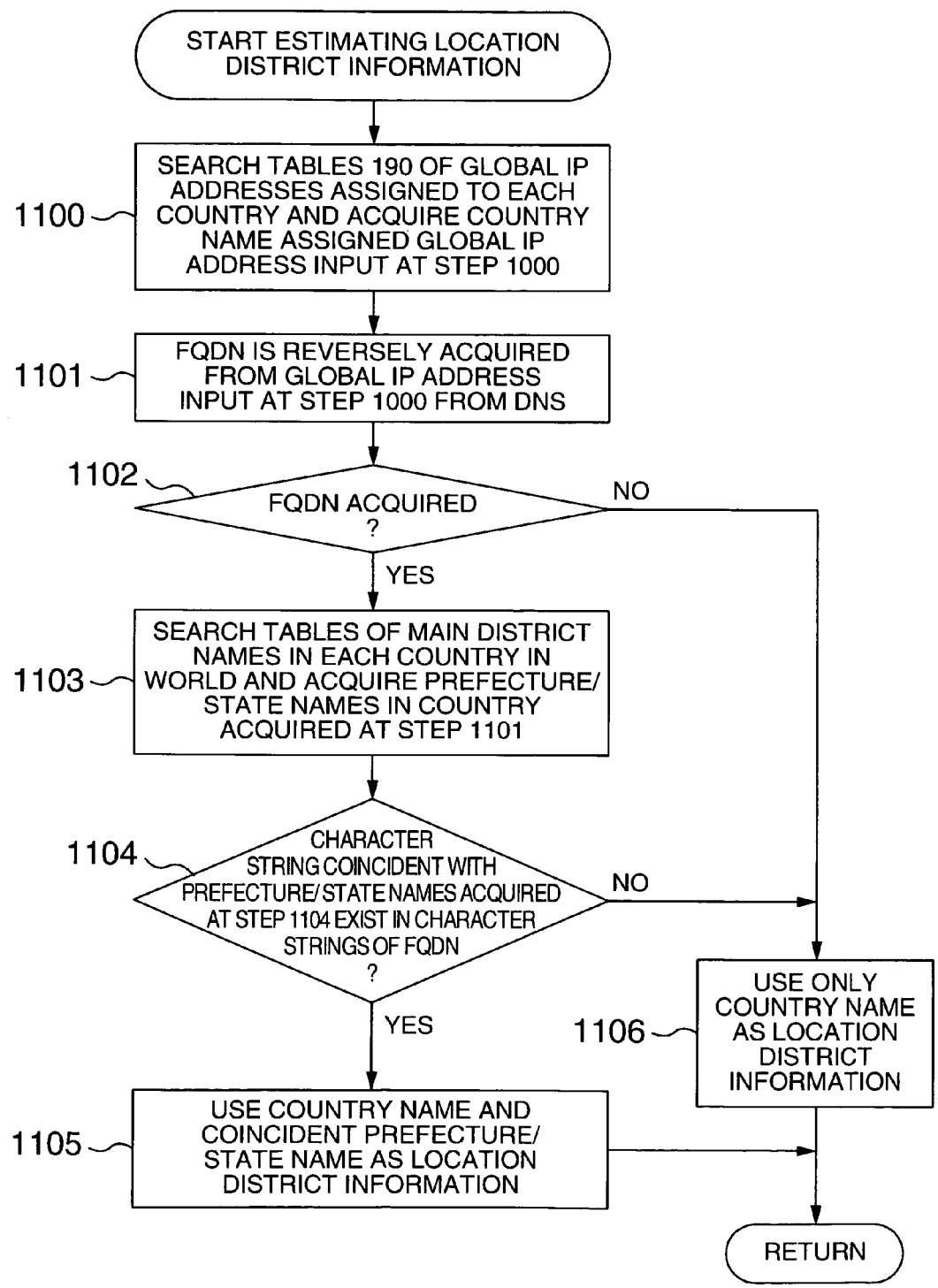
FIG. 9 is a flow chart illustrating a subroutine of a process of estimating location district information to be executed at Step 1005 of FIG. 8.
Figure 10:
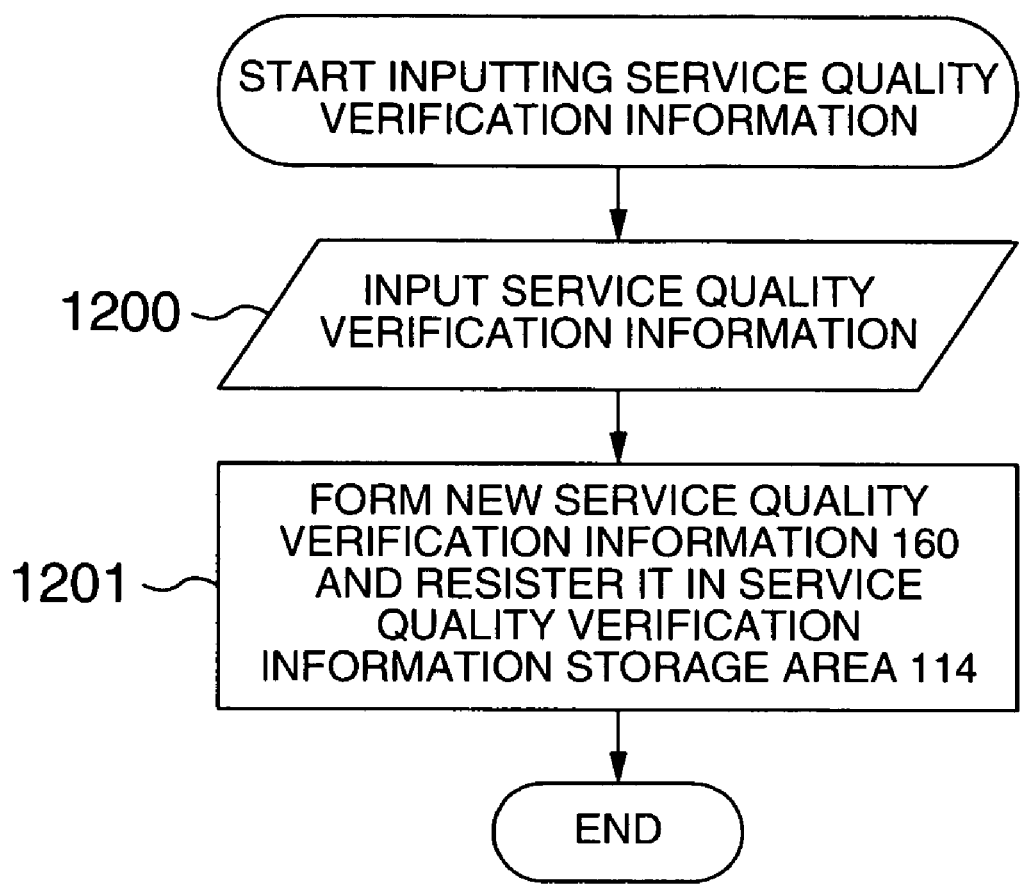
FIG. 10 is a flow chart illustrating a process of registering service quality verification information.
Figure 11:
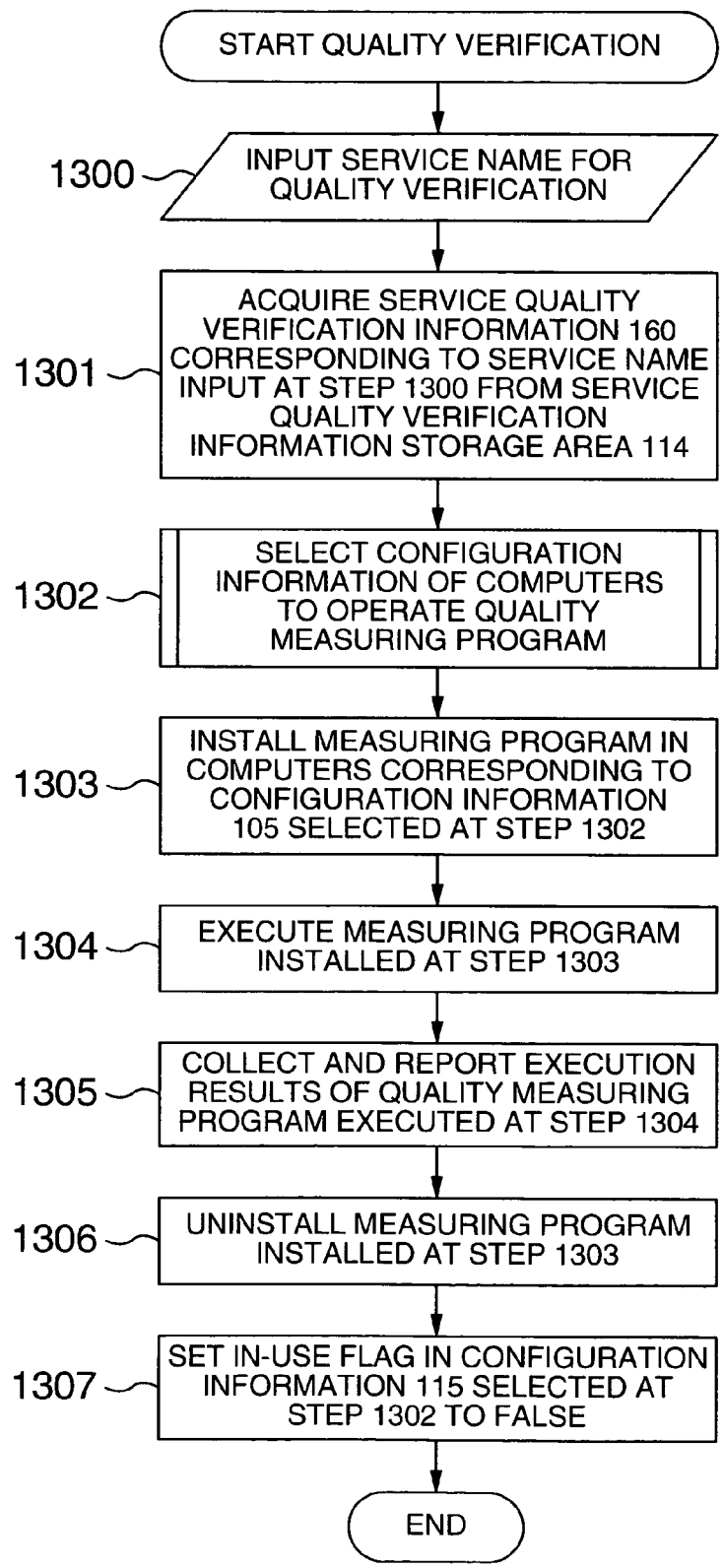
FIG. 11 is a flow chart illustrating a service quality verifying process.
Figure 12:
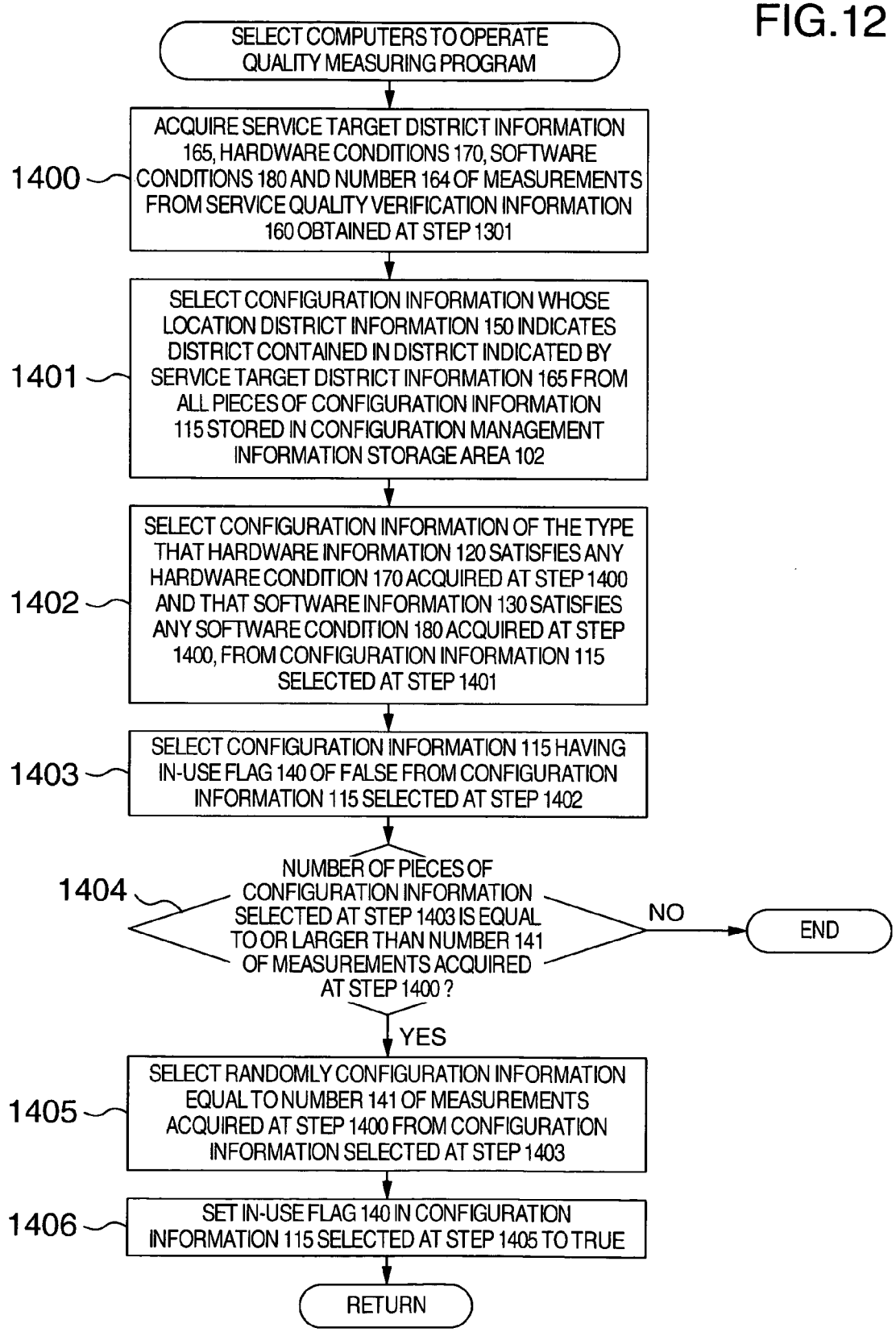
FIG. 12 is a flow chart illustrating a subroutine of a process of selecting configuration management information from a service target district, the process being executed at Step 1302 of FIG. 11.

FIG. 8 is a flow chart illustrating an example of a process of registering a new management target computer 300 to be executed by the provisioning mechanism 110 of the management computer 100, FIG. 9 is a flow chart illustrating an internal process used in FIG. 8, FIG. 10 is a flow chart illustrating a process of registering the service quality verification information 160, FIG. 11 is a flow chart illustrating a service quality verifying process, and FIG. 12 is a flow chart illustrating an internal process used in FIG. 11.

FIG. 8 is a flow chart illustrating an example of the process contents of the provisioning mechanism 110 when the computer 330 participates in the global grid as a new management target computer 300 and is newly registered in the configuration management information 115.

It is first assumed that the agent program 310 is preinstalled in and runs on the new management target computer 300.

At Step 1000, an administrator of the new management target computer 300 enters the global IP address assigned to the new management target computer 300.

At Step 1001, communication is performed with the new management target computer 300 having the global IP address input at Step 1000 to collect the hardware information and software information of the new management target computer 300.

At Step 1002, new configuration management information 115 is formed and stored in the configuration management information storage area 112, and the hardware information and software information of the computer collected at Step 1001 is registered in the new configuration management information 115 as the hardware information 120 and software information 130.

At Step 1003, the administrator of the new management target computer 300 inputs information of whether there is an input of the location district information of the new management target computer 300 having the global IP address input at Step 1000.

At Step 1004, the information input at Step 1003 of whether there is an input of the location district information is checked, and if an input is to be made, the process advances to Step 1006, whereas if an input is not to be made, the process branches to Step 1005.

At Step 1005, the location district information of the new management target computer 300 is estimated from the global IP address input at Step 1000. Estimating the location district information is performed by using the sequence of FIG. 9 to be described later.

At Step 1006, the administrator of the new management target computer 300 inputs the location district information of the new management target computer 300 having the global IP address input at Step 1000.

At Step 1007, the location district information input at Step 1006 or estimated at Step 1005 is stored in the new configuration management information 115 formed at Step 1002, as the location district information 150.

At Step 1008, the in-use flag 141 in the new configuration management information 115 formed at Step 1002 is set to False to thereafter terminate the process.

FIG. 9 is a flow chart illustrating the process contents of the provisioning mechanism 110 when the location district information is estimated at Step 1005 shown in FIG. 8.

At Step 1100, the global IP address input at Step 1000 is searched from the tables 190 of global IP addresses assigned to each country to acquire the country name assigned the global IP address.

At Step 1101, the domain name is reversely acquired from the global IP address acquired at Step 1000 of FIG. 8 from a DNS (Domain Name System) server. If an FQDN (Fully Qualified Domain Name) exists as the reverse acquisition result, this FQDN is acquired.

At Step 1102, if FQDN can be acquired at Step 1101, the flow advances to Step 1103, whereas if FQDN cannot be acquired at Step 1101, the flow jumps to Step 1106.

At Step 1103, all prefecture/state names 202 existing in the country of the domain name acquired at Step 1101 are acquired from the tables 200 of main district names of each country in the world.

At Step 1104, it is checked whether a character string coincident with any one of the prefecture/state names 202 acquired at Step 1103 exists in the character strings of FQDN acquired at Step 1101. If the coincident prefecture/state name 202 exists, the flow advances to Step 1105, whereas if it does not exist, the flow advances to Step 1106.

At Step 1105, both the country name acquired at Step 1100 and the coincident prefecture/state name 202 at Step 1104 are used as the location district information of the computer.

At Step 1106, since the coincident prefecture/state name 202 does not exist, only the country name acquired at Step 1100 is used as the location district information of the computer.

With the above processes, the country name and prefecture/state name can be acquired from the global IP address of the management target computer 300 to be newly added.

FIG. 10 is a flow chart illustrating an example of the process contents of the provisioning mechanism 110 when the service quality verification information 160 is registered, according to the embodiment.

At Step 1200, an administrator of the network services 420 inputs from the management computer 100 information corresponding to all factors in the service quality verification information 160, among the information of the network services 420, as the service quality verification information.

At Step 1201, new service quality verification information 160 is formed by using the service quality verification information 160 input at Step 1200, and stores it in the service quality verification information storage area 114.

FIG. 11 is a flow chart illustrating an example of the process contents of the provisioning mechanism 110 when the service quality verification of the network services 420 is conducted for a particular district.

It is assumed that the service quality verification information 160 of the network services 420 corresponding to the service name input at Step 1300 has already been registered by the process of FIG. 10.

At Step 1300, an administrator of the network services 420 inputs the service name of the network services 420 for quality verification, to the management computer 100. The service name may be input from the server computer 400 at a position geographically different from that of the management computer 100 or from the management target computer 300, and transmitted to the management computer 100 which receives it.

At Step 1301, the service quality verification information 160 corresponding to the service name input at Step 1300 is acquired from the service quality verification information storage area 114.

At Step 1302, the configuration management information 115 of the management target computers 300 running the service quality measuring program 162 stored in the service quality verification information 160 acquired at Step 1301 is selected from all pieces of the configuration management information 115 in the configuration management information storage area 112. The process of selecting the configuration management information 115 of the management target computers 300 running the service quality measuring program 162 is executed by the sequence of FIG. 12 to be described later.

At Step 1303, the quality measuring program 162 stored in the service quality verification information 160 acquired at Step 1301 is installed in the management target computers 300 corresponding to all pieces of the configuration management information 115 selected at Step 1302.

At Step 1304, an instruction is sent to the management target computers 300 corresponding to all pieces of the configuration management information 115 selected at Step 1302 to make the computers execute the quality measuring program 162 installed at Step 1303.

At Step 1305, the provisioning program 113 collects all the execution results of the quality measuring program 162 executed by each management target computer 300 at Step 1304, and the execution results are notified to the administrator of the network services 420 whose service name was input at Step 1300. Notification to the administrator is performed by transmitting the execution result of the quality measuring program 162 at each management target computer 300 to a predetermined server computer 400 which outputs the received information to a management console (not shown) or the like.

At Step 1306, the quality measuring program 162 installed at Step 1303 is uninstalled from the management target computers 300 selected at Step 1302.

At Step 1307, the in-use flag 140 of the configuration management information 115 corresponding to the management target computers 300 selected at Step 1302 is set to False.

FIG. 12 is a flow chart illustrating an example of the process contents of the provisioning mechanism 110 when the configuration management information 115 of the computer 30 running the quality measuring program 162 is selected.

The processes from Step 1401 to Step 1406 are executed exclusively to maintain consistency of the in-use flag 140 in each piece of the configuration management information 115.

First at Step 1400, the service target district information 165, all hardware conditions 170 all software conditions 180 and the number 164 of measurements are acquired from the service quality verification information 160 of the management target computer 300 acquired at Step 1301 of FIG. 11.

At Step 1401, the configuration management information 115 whose location district information 150 indicates a district contained in the district indicated by the service target district information 165 acquired at Step 1400 is selected from all pieces of the configuration management information 115 stored in the configuration management information storage area 102.

At Step 1402, the configuration management information 115 is selected which is of the type that the hardware information 120 in the configuration management information 115 selected at Step 1401 satisfies at least one of all the hardware conditions acquired at Step 1400 and that the software information 130 in the configuration management information 115 satisfies at least one of all the software conditions 180 acquired at Step 1400.

At Step 1403, the configuration management information 115 having the in-use flag 140 of False is selected from the configuration management information 115 selected at Step 1402.

At Step 1404, if the number of pieces of the configuration management information 115 selected at Step 1403 is equal to or larger than the number 164 of measurements selected at Step 1400, the flow advances to Step 1405.

If the number of pieces of the configuration management information 115 selected at Step 1403 is smaller than the number 164 of measurements selected at Step 1400, it means that the management target computers 300 equal to the number of measurements cannot be reserved, so that an error is issued to terminate the process.

At Step 1405, pieces of the configuration management information equal to the number 164 of measurements acquired at Step 1400 are selected from the configuration management information 115 selected at Step 1403.

At Step 1406, the in-use flag 140 in the configuration management information 115 selected at Step 1405 is set to True.

With the above processes, as the administrator of the network services 420 supplies the provisioning mechanism 110 with the predefined service name for quality verification, the provisioning mechanism 110 selects the management target computer 300 corresponding to the service target district information 165 defined by the service quality verification information 160, from the configuration management information 115.

The provisioning mechanism 110 installs the quality measuring program 162 in the selected management target computer 300 to make it execute the quality measurement. In the management target computer 300, the agent program 310 manages installation, execution and uninstallation of the quality measuring program 162, and notifies the execution result of the quality measuring program to the management computer 100.

In the management computer 100, the provisioning program 113 collects the execution result of each management target computer 300 to collect response times and throughputs of services between the client (management target computer 300) in the measurement target district and the server (server computer 400) and notify them to the administrator.

As described above, a quality measuring computer is not disposed in each service target district contrary to the conventional case, but the agent program 310 is installed in each management target computer 300 registered beforehand and a single management computer 100 operating the provisioning mechanism 110 is disposed. Accordingly, the quality measurement of the network services 420 in each district can be performed easily and quickly in the grid of the global scale. The cost of the quality measurement can be reduced considerably as compared to the conventional case. The optimum structure of the server computer 400 and the like can be grasped in each service target district in accordance with the quality measurement results.

Since the quality measurement is performed by the management target computers 300 registered beforehand in the configuration management information 115 and by the management computer 100, a work by an administrator for the quality measurement, such as authentication, is not necessary so that the administrator labor can be reduced considerably as compared to the conventional case.

The district information 150 of each management target computer 300 is acquired by reversely obtaining FQDN from a global IP address, so that the district information 150 can be estimated easily without an administrator labor.

Although the district information 150 is acquired by reversely obtaining FQDN from the global IP address of the management target computer 300, the district information 150 of the management target computer 300 may be estimated from FQDN of the computer whose district information can be reversely obtained and which is nearest to the management target computer 300 on the route from the management computer 100 to the management target computer 300.

Figure 13:
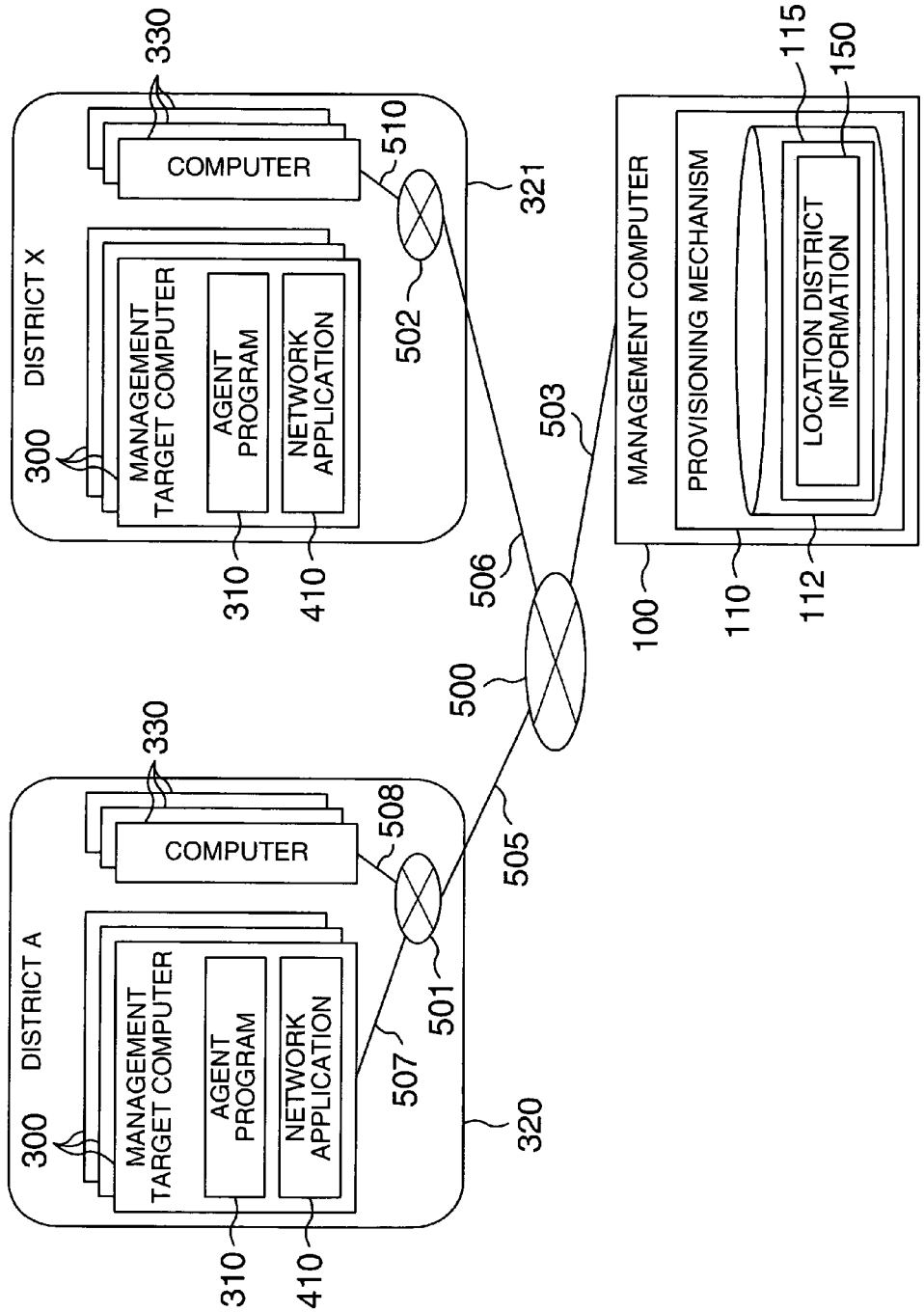
FIG. 13 is a diagram showing the whole configuration of a system according to a second embodiment.
Figure 14:
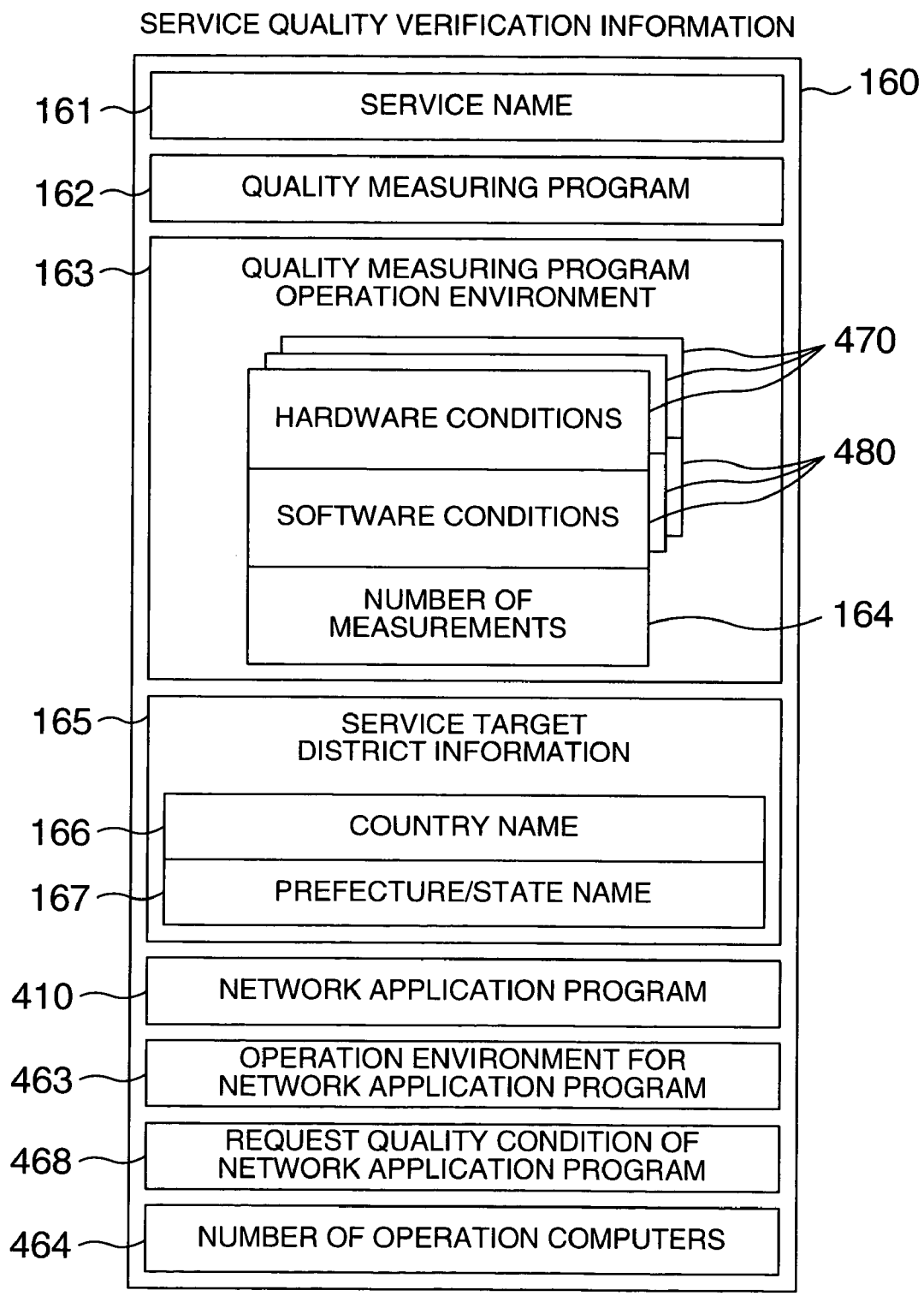
FIG. 14 is an illustrative diagram showing the contents of a service quality verifying process constituting the provisioning mechanism.
Figure 15:
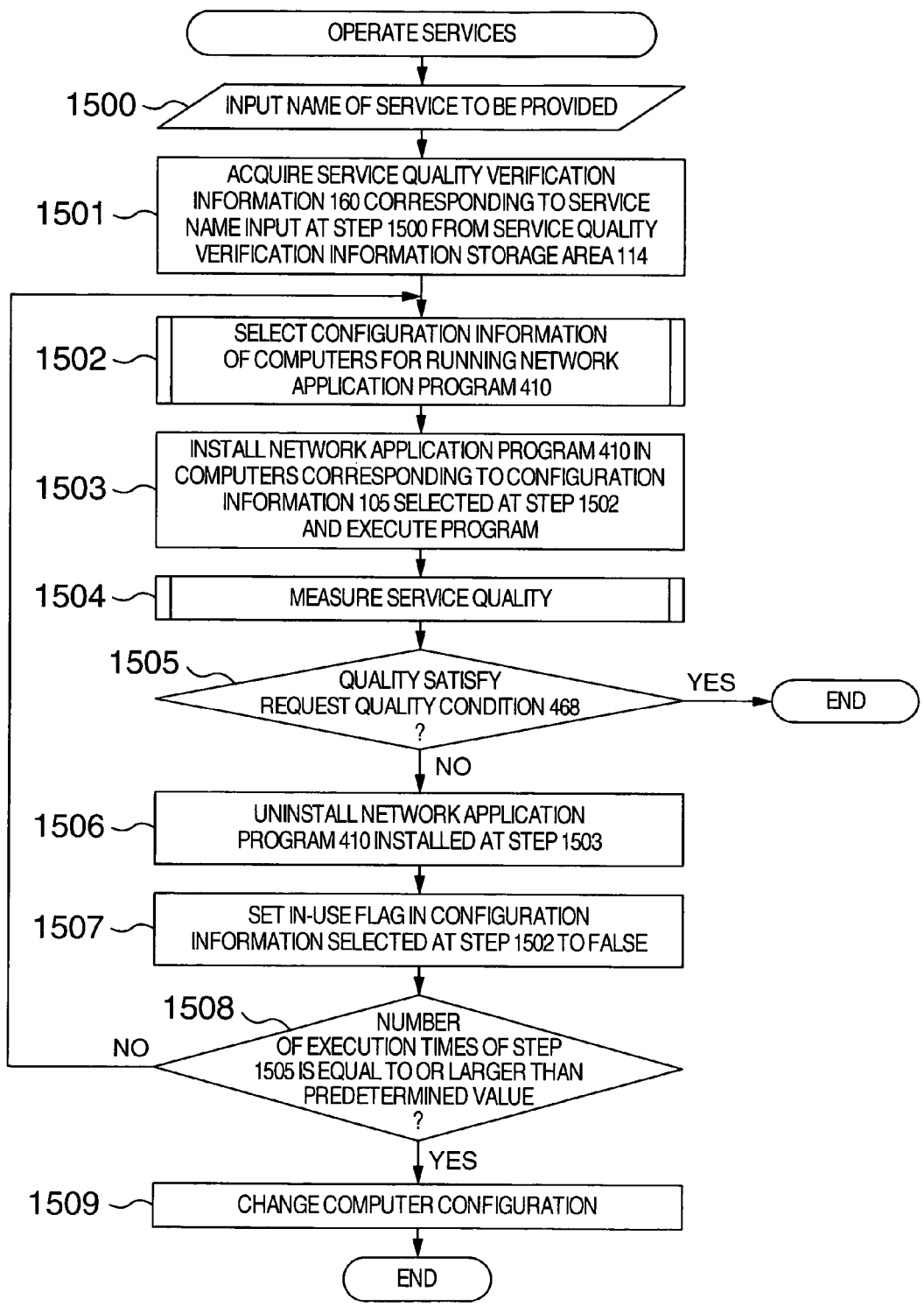
FIG. 15 is a flow chart illustrating a service quality verifying process according to a third embodiment.

FIGS. 13 to 15 illustrate the second embodiment. In the system shown in FIG. 13, instead of the server computers 400 of the first embodiment, clients (management target computers 300) execute a network application 410 to provide the network services 420.

As shown in FIG. 14, a network application program 410, an operation environment 463 for the network application program and a request quality 468 of the network application program are added to the service quality verification information 160 shown in FIG. 5. The other structures are similar to those of the first embodiment.

As the network application program 410 runs on a predetermined management target computer 300, the network services 420 are supplied to another management target computer 300 in the same district.

The operation environment 463 for the network application program is an operation environment necessary for the operation of the network application program 410.

The number 464 of operation computers is the number of management target computers 300 running the network application program 410. The operation environment 463 of the network application program 410 is constituted of a plurality of hardware conditions 470, a plurality of software conditions 480 and the number of operation computers 464.

The contents of the hardware conditions 470 and software conditions 480 are similar to those of the hardware conditions 170 and software conditions 180 of the first embodiment. The hardware conditions 470 and software conditions 480 are hardware conditions and software conditions of each management target computer 300 capable of running the network application program 410.

The request quality condition 468 is a condition to be satisfied by throughput and latency of the measured quality of the network services 420 conducted by making the quality measuring program 162 run the network application program 410.

In this case, the network application program 410 is installed in the predetermined number of management target computers 300 which in turn provide the network services 420. For the management target computer 300 installed with the network application program 410, an identifier representative of provision of the network services 420 is added to the configuration management information 115.

Similar to the first embodiment, the management target computer 300 in the target district preset by each service name is selected, and the quality measuring program 162 is installed in the selected management target computer 300 to conduct the quality measurement.

In this case, since the operation environment 463 and the predetermined number 464 of operation computers 464 are reserved for the management target computer 300 providing the network services 420, it is possible to provide services equivalent to those obtained by using the server computer 400 of the first embodiment.

Since there is a high possibility that the client (management target computer 300) providing the network services 420 is changed, as different from the first embodiment, the provisioning mechanism 110 selects the quality measurement target providing the network services 420 by using the identifier, notifies the quality measurement target to the client management target computer 300 and thereafter executes the quality measuring program 162. Thereafter, similar to the first embodiment, the quality measurement results are collected and notified to an administrator.

FIG. 15 is a flow chart illustrating an example of the process to be executed by the system illustrated in FIGS. 13 and 14.

Prior to the quality verification for the network services 420 illustrated in the process of FIG. 11 of the first embodiment, a service quality measuring process of FIG. 15 is executed. The other structures are similar to those of the first embodiment.

The flow chart of FIG. 15 of the second embodiment illustrates a process of providing the network services 420 for a particular district, performing the quality measurement of the management target computer 300 in the service target district provided with the network services 420, verifying whether the quality of the network services 420 is satisfactory, and if the quality is not satisfactory, changing the computer (server computer 400 or management target computer 300) which provides the network services 420.

At Step 1500, an administrator of the network services 420 inputs the service name of the network services 420 to be provided.

At Step 1501, the service quality verification information 160 corresponding to the service name input at Step 1500 is acquired from the service quality verification information storage area 114.

At Step 1502, the configuration management information 115 of the management target computers 300 running the network application program 410 stored in the service quality verification information 160 acquired at Step 1501 is selected from all pieces of the configuration management information 115 in the configuration management information storage area 112.

The process of this Step 1502 is assumed that in all Steps of FIG. 12, the quality measuring program 162 is replaced with the network application program 410, the hardware conditions 170 are replaced with the hardware conditions 470, the software conditions 180 are replaced with the software conditions 480 shown in FIG. 14, the number 164 of measurements is replaced with the number 464 of operation computers 464 shown in FIG. 14, and Step 1401 of FIG. 12 is replaced by a process of acquiring all pieces of the configuration management information 115 stored in the configuration management information storage area 112.

At Step 1503, the network application program 410 stored in the service quality verification information 160 acquired at Step 1501 is installed in the management target computers 300 corresponding to all pieces of the configuration management information 115 selected at Step 1502, to run the installed network application program 410 on the management target computers 300.

At Step 1504, the quality of the network services 420 provided by running the network application program 410 at Step 1503 is measured. The measurement of the quality of the network services 420 is performed by changing the process at Step 1300 in FIG. 11 of making a service administrator input the service name for quality verification, to the process at Step 1500 of inputting the service name of the service to be provided.

At Step 1505, it is judged whether the quality measured at Step 1504 satisfies the request quality condition 468 in the service quality verification information 160 acquired at Step 1501. If the quality measured at Step 1504 satisfies the request quality condition 468, the process is terminated, whereas if the quality measured at Step 1504 does not satisfy the request quality condition 468, the process advances to Step 1506.

At Step 1506, the network application program 410 installed at Step 1503 is uninstalled from the management target computers 300 selected at Step 1502.

At Step 1507, the in-use flag 140 of the configuration management information 115 corresponding to the management target computers 300 selected at Step 1502 is set to False.

At Step 1508, if Step 1505 is executed the predetermined number of times or more, e.g., five times or more, as counted from the execution start of Step 1500, a notice indicating that the process was unable to be executed normally is notified to the administrator of the network services 420 provided by running the network application program 410 at Step 1503, to thereafter terminate the process. If the process is not terminated, the flow returns to Step 1502 to again execute the above-described processes.

Lastly at Step 1509, if the network services 420 cannot satisfy the predetermined request quality condition, the server computer 400 or management target computer 300 (for providing the network services 420) performs a predetermined change.

As described above, the optimum configuration of the management target computer 300 can be known which satisfies the request quality condition 468 input by an administrator of the network services 420. Namely, the configuration of a management target computer 300 assigned to a host (management target computer 300 providing network services 420) accessed by other management target computers can be changed to optimize the service quality.

If the service quality does not satisfy the predetermined request quality condition, the quality measurement is repeated up to a predetermined plurality of times so that stable quality measurement is possible even if the load change on the Internet side is large.

Even if the network services 420 are provided distributively to client computers 300, the quality measurement of the network services 420 can be performed easily and quickly.

In the first embodiment, judgment may be made by the request quality condition 468 to know the optimum configuration of the server computer 400 and change to the optimum configuration, as in the second embodiment.

<1st Modification>

The process at Step 1000 in FIG. 8 of the first embodiment may be replaced with a process of making an administrator of the new management target computer 300 input FQDN and reversely obtaining an IP address of the new management target computer 300 from DNS. The process at Step 1101 in FIG. 9 of reversely obtaining FQDN may be replaced with a process of acquiring FQDN input at Step 1000.

<2nd Modification>

In the first modification, the quality verification process in FIG. 11 of the first embodiment is not executed. In the process at Step 1401 in FIG. 12 (selecting configuration management information corresponding to the service target district) used by the process at Step 1502 in FIG. 15 (acquiring configuration management information of a computer), the configuration management information 115 may be selected from all pieces of the configuration management information 115 stored in the configuration management information storage area 102, the selected configuration management information having the location district information 150 indicating the coincident district with the service target district indicated by the service target district information 165 acquired at Step 1400.

It is therefore possible to operate the network application 410 on the management target computer 300 in the service target district of the network services 420.

<3rd Modification>

Figures 16, 17:
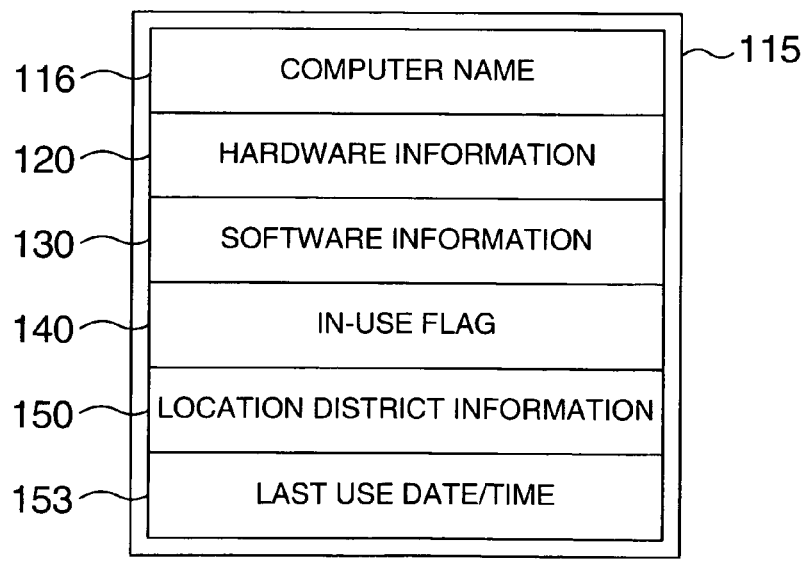
FIG. 16 is an illustrative diagram showing another example of a main district name table.
FIG. 17 is an illustrative diagram showing another example of the configuration management information.

In the above embodiments and modifications, as shown in FIG. 16, a population 204 may be added to the table 200 of main district names of each country in the world. A set of the country name 201, prefecture/state name 202 and population 204 is stored.

The population 204 indicates the population in the district corresponding to the prefecture/state name 202 in the country name 201. A population distribution in main districts of each country in the world can be calculated.

If the service target district of the network services 420 is a country, the process at Step 1405 of FIG. 12 selects the management target computer 300 in the main district in the country in accordance with the population distribution ratios in the country.

In the example shown in FIG. 16, the table 200 of main district names in each country in the world has three prefecture/state names 202 in the country name 201 of Japan, including Tokyo, Osaka and Aichi. If the population ratio of three districts is 3:2:1 and the number 464 of operation computers is 6, then three management target computers are disposed in Tokyo, two management target computers are disposed in Osaka, and one management target computers is disposed in Aichi.

In this manner, provisioning or quality verification is possible by considering a population distribution in service target districts.

<4th Modification>

In the above embodiments and modifications, as shown in FIG. 17, a last use date/time 153 is added to the configuration management information 115 of the first embodiment shown in FIG. 2.

The last use date/time 153 is the last use date/time when the provisioning mechanism 110 used the management target computer 300 identified by the configuration management information 115. The initial value is 1970:1 m:1 d:0 h:0 m:0 s of Greenwich mean time.

In this case, Step of entering a current date/time to the last use date/time 153 in the configuration management information 115 selected at Step 1405 is added to Step 1406 of FIG. 12.

Step 1403 of FIG. 12 is replaced with a process of selecting pieces of the configuration management information 115 equal to the number 164 of measurements acquired at Step 1400 in the order of an older last date/time 153.

The provisioning mechanism 110 can uniformly use the management target computers 300 in each district.

<5th Modification>

In the second embodiment and modifications, the request quality condition 468 shown in FIG. 14 is replaced with a best quality value, and Steps 1504 and 1505 of FIG. 15 are modified as in the following. The best quality value is the best value among measured throughputs and response times.

At Step 1504, a process of updating the best quality value is added after the process of the first modification.

In the process of updating the best quality value, the quality measured at Step 1504 is used as the best quality value when Step 1504 is executed first time. When Step 1504 is executed second time and following times, the best quality value is compared with the quality value measured at Step 1504. If the quality value measured at Step 1504 is better, the best quality value 469 is updated to the quality value measured at Step 1504.

At Step 1505, the process is terminated if the update of the best quality value at Step 1504 occurs a predetermined times, e.g., five times. If the process is not terminated at Step 1504, the flow advances to Step 1506.

In this manner, by changing the management target computer 300 running the network application program 410, the quality of the network services 420 provided by the network application program 410 can be automatically optimized.

<6th Modification>

In the second embodiment and modifications, an application providing distributed storage services may be used as the network application program 410. Throughput and latency of file transfer are measured between the management target computer 300 providing the distributed storage services and the management target computer 300 running the quality measuring program 162 to thereby search the storage layout by the distributed storage services which can reduce the throughput and latency as small as possible.

In this manner, the quality of an access from a client of the distributed storage services to the distributed storages can be automatically optimized.

<7th Modification>

In the second embodiment and modifications, as shown in FIG. 16, a longitude/latitude 203 of each main district may be added to the table 200 of main district names of each country in the world. A set of the country name 201, prefecture/state name 202 and longitude/latitude 203 is stored. The longitude/latitude 203 is a longitude and a latitude of a central city in the district corresponding to the country name 201 and prefecture/state name 202.

In this manner, the distance between desired cities in the main district name table 200 can be calculated.

If the network services 420 are distributed services such as distributed storage services, the network services are provided by the process of FIG. 15 in the fifth modification, not only in the service target district of the network services 420, but also in a randomly selected district remote from the service target district by a predetermined distance, e.g., 200 km or more.

Further, even if an accident occurs in the service target district, since the network services 420 are provided in the remote district, the services resistant to accidents can be provided.

A computer resource management method of managing a plurality computer resources capable of mutual communications via a network, by using configuration management information including district information of the computer resources, may be a computer resource management method characterized by selecting the configuration management information including particular district information from all pieces of the configuration management information.

The computer resource management method may be a computer resource management method characterized by estimating the district information of the computer resource in accordance with a global IP address assigned to the computer resource.

The computer resource management method may be a computer resource management method characterized by estimating the district information of the computer resource in accordance with a fully qualified domain name assigned to the computer resource.

The computer resource management method may be a computer resource management method characterized by estimating the district information of a computer resource in accordance with a fully qualified domain name reversely obtained from DNS by using a global IP address assigned to the computer resource.

As described so far, according to the present invention, the quality of network services in each service target district can be measured easily so that the invention is applicable to a management system of a global grid and a management system of data centers.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A computer-readable storage medium including a program readable by a management computer, tangibly embodying a program of instructions executable by the management computer to perform method steps for measuring a quality of services provided by a server computer to a plurality of computers on a network, in a system which includes the server computer for providing the services to the plurality of computers connected to the server computer via the network, and the management computer connected to the plurality of computers via the network, said method comprising:

a process of acquiring configuration management information including district information of each of said plurality of computers;

a process of setting a search condition of measuring the quality of services including said district information, wherein said process of setting said search condition includes a process of setting a district in which the computers selectable by the management computer are located and the quality of services for the computers is measured;

a process of searching the acquired configuration management information and selecting the configuration management information matching said measuring search condition;

a process of installing a preset quality measuring program in the computers corresponding to said selected configuration information;

a process of making said selected computers execute said quality measuring program; and a process of collecting an execution result of said quality measuring program.

2. The storage medium according to claim 1, wherein said process of acquiring said configuration management information comprises:

a process of acquiring a fully qualified domain name in accordance with a global address assigned to each of said plurality of computers;

a process of estimating the district information of each of said plurality of computers in accordance with the fully qualified domain name; and a process of setting said estimated district information to said configuration management information.

3. The storage medium according to claim 1, wherein said process of setting said search condition includes a process of setting the number of computers, on which the quality of services is measured in said district, to be used for selecting the configuration management information.

4. The storage medium according to claim 1, wherein said process of setting said search condition includes a process of setting the number of computers, on which the quality of services is measured in said district, to be used for selecting the configuration management information and said process of setting the number of computers sets the number of computers in accordance with a population ratio preset for each of said districts.

5. The storage medium according to claim 1, wherein said process of making said selected computer execute said quality measuring program includes a process of recording an execution date/time associated with the selected computer in said configuration management information, and said process of selecting said configuration management information includes a process of selecting said configuration management information in the order of an older date/time when the computer executes said quality measuring program.

6. The storage medium according to claim 1, wherein said process of collecting said execution result includes a process of judging whether said execution result of said quality measuring program satisfies a predetermined quality and a process of making again said selected computer execute said quality measuring program up to a predetermined number of times if said execution results does not satisfy said predetermined quality.

7. A method of measuring a quality of network services provided by a server computer to a plurality of computers on a network, in a system which includes the server computer for providing the services to the plurality of computers connected to the server computer via the network, and the management computer connected to the plurality of computers via the network, comprising:

a step of acquiring by the management computer configuration management information including district information of each of said plurality of computers;

a step of setting a search condition of measuring the quality of services including said district information, wherein said step of setting said search condition includes a step of setting a district in which the computers selectable by the management computer are located and the quality of services for the computers is measured;

a step of searching the acquired configuration management information and selecting the configuration management information matching said measuring condition;

a step of installing a preset quality measuring program in the computers corresponding to said selected configuration information;

a step of making said selected computers execute said quality measuring program; and a step of collecting an execution result of said quality measuring program.

8. The method according to claim 7, wherein said step of acquiring said configuration management information comprises:

a step of acquiring a fully qualified domain name in accordance with a global address assigned to each of said plurality of computers;

a step of estimating the district information of each of said plurality of computers in accordance with the fully qualified domain name; and a step of setting said estimated district information to said configuration management information.

9. The method according to claim 7, wherein said step of setting said search condition includes a step of setting the number of computers, on which the quality of services is measured in said district, to be used for selecting the configuration management information.

10. The method according to claim 9, wherein said step of setting said search condition includes a step of setting the number of computers, on which the quality of services is measured in said district, to be used for selecting the configuration management information and said step of setting the number of computers sets the number of computers in accordance with a population ratio preset for each of said districts.

11. The method according to claim 7, wherein said step of making said selected computer execute said quality measuring program includes a step of recording an execution date/time associated with the selected computer in said configuration management information, and said step of selecting said configuration management information includes a process of selecting said configuration management information in the order of an older date/time when the computer executes said quality measuring proqram.

12. The method according to claim 7, wherein said step of collecting said execution result includes a step of judging whether said execution result of said quality measuring program satisfies a predetermined quality and a step of making again said selected computer execute said quality measuring program up to a predetermined number of times if said execution results does not satisfy said predetermined quality.

13. The method according to claim 7, wherein each of said plurality of computers is provided with network services from a preset server computer, and said step of making said selected computer execute said quality measuring program measures a quality between said selected computer and said server computer.

14. The method according to claim 13, further comprising a step of changing the server computer providing network services to each of said plurality of computers, in accordance with the execution result of said quality measuring program.

15. The method according to claim 7, wherein each of said plurality of computers is provided with network services from a client computer, and said step of making said selected computer execute said quality measuring program measures a quality between said selected computer and said client computer.

16. The method according to claim 15, further comprising a step of changing the client computer providing network services to each of said plurality of computers, in accordance with the execution result of said quality measuring program.

* * * * *